United States Patent
Onishi et al.

(10) Patent No.: US 6,290,403 B1
(45) Date of Patent: Sep. 18, 2001

(54) SEQUENCE PROGRAM EXECUTION CONTROL SYSTEM

(75) Inventors: Yasushi Onishi, Fujiyoshida; Yoshiharu Saiki, Oshino-mura, both of (JP)

(73) Assignee: Fanuc LTD, Minamitsuru (JP)

( * ) Notice: Subject to any disclaimer, the term of this patent is extended or adjusted under 35 U.S.C. 154(b) by 0 days.

(21) Appl. No.: 08/860,628

(22) PCT Filed: Nov. 11, 1996

(86) PCT No.: PCT/JP96/03308

§ 371 Date: Jul. 3, 1997

§ 102(e) Date: Jul. 3, 1997

(87) PCT Pub. No.: WO97/17638

PCT Pub. Date: May 15, 1997

(30) Foreign Application Priority Data

Nov. 9, 1995 (JP) .................................................. 7-290222

(51) Int. Cl.$^7$ ................................................. G05B 11/01
(52) U.S. Cl. .............................................................. 395/376
(58) Field of Search ............................... 364/DIG. 2 MS, 364/DIG. 2, 140, 147, 187; 345/348, 349, 433; 395/376

(56) References Cited

U.S. PATENT DOCUMENTS

| | | | |
|---|---|---|---|
| 5,287,548 | * | 2/1994 | Flood et al. ........................ 364/147 |
| 5,291,389 | * | 3/1994 | Iwata ................................ 364/140.04 |
| 5,369,569 | * | 11/1994 | Maeola et al. ...................... 364/184 |
| 5,426,730 | * | 6/1995 | Miyake et al. ...................... 345/349 |
| 5,590,253 | * | 12/1996 | Onishi et al. ...................... 345/433 |
| 5,687,074 | * | 11/1997 | Tanaka et al. .................. 364/140.09 |

FOREIGN PATENT DOCUMENTS

| | | |
|---|---|---|
| 1-169504 | 7/1989 | (JP) . |
| 3-154102 | 7/1991 | (JP) . |
| 5-73115 | 3/1993 | (JP) . |
| 5-189016 | 7/1993 | (JP) . |
| 5-224986 | 9/1993 | (JP) . |
| 5-313709 | 11/1993 | (JP) . |
| 6-51816 | 2/1994 | (JP) . |
| 6-75608 | 3/1994 | (JP) . |
| 6-202718 | 7/1994 | (JP) . |
| 7-114404 | 5/1995 | (JP) . |

* cited by examiner

*Primary Examiner*—Robert B. Harrell
(74) *Attorney, Agent, or Firm*—Staas & Halsey

(57) ABSTRACT

A memory (1) stores a sequence program (1a) expressed in a step format. Execution control device (2) executes this sequence program (1a), thereby carrying out operation control on the side of a machine (3). Display control device (4) displays the sequence program (1a) on a display screen of a display device (5), and displays various commands inputted by means of a keyboard (6), in the form of menus. An operator specifies a step by way of the keyboard (6), and also commands to interrupt the execution of the sequence program by way of the keyboard (6). Thereupon, execution stop control device (7) stops the execution of the sequence program in the specified step.

9 Claims, 5 Drawing Sheets

SEQUENCE PROGRAM EXECUTION CONTROL SYSTEM

TECHNICAL FIELD

The present invention relates to a sequence program execution control system for executing a sequence program, such as an SFC (sequential function chart), that is expressed in a step format.

BACKGROUND ART

A ladder format and mnemonic format are typical expression methods for a sequence program that is executed by means of a programmable controller (hereinafter referred to as PC). Recently, however, a sequence program expressed in a step format, such as an SFC (sequential function chart), has also come to be used.

The sequence program expressed in the step format, unlike the ladder format, is not executed by scanning, but is executed step by step in regular order. When the execution of a final step is completed, the sequence program is finished through, and thereafter, the steps are repeated.

In some cases, the execution of the sequence program in this step format may be expected to be interrupted on account of a machine's failure, checkup of the machine in the middle of programming, etc. The execution can be interrupted either by the method in which the power source of the PC is turned off to restart the processing from the beginning or by the method in which the content of the sequence program is previously set so that the execution can be stopped in a predetermined position.

The method in which the power source of the PC is turned off, however, has a problem such that it requires time-consuming adjustment such as initialization of a machine before resuming a sequence program by reconnecting the power source. Further, in the case where the PC is connected to a network, the power source cannot be turned off without considering its effect.

On the other hand, in the case of the method in which the sequence program is preset for interruption, it is difficult to previously specify a spot at which interruption of the execution is required. Since troubles cannot be foreseen, the execution cannot be interrupted for inspection of faulty spots in the case of this method.

DISCLOSURE OF THE INVENTION

The object of the present invention is to provide a sequence program execution control system capable of manually specifying one or two or more of a plurality of steps constituting a sequence program so that the specified step can be either interrupted or unexecuted, and the program is made to proceed to the next unspecified steps.

In order to achieve the above object, a sequence program execution control system according to the present invention comprises program storage means for storing a sequence program composed of a plurality of steps, an execution control means for executing the sequence program by the unit of step and in regular order to control the operation of a machine, step specifying means capable of specifying any one or two or more of the steps constituting the sequence program stored in the program storage means, and skip command means for enforcing the execution control means to skip the specified step to proceed to the next step.

Preferably, the step specifying means and the skip command means are respectively provided in the form of command keys to a manual input device with display screen connected to a numerical control device or an automatic programming apparatus connected to a numerical control device.

Further preferably, the manual input device with display screen further includes, respectively in the form of command keys, interruption command means for commanding the execution control means to interrupt the execution of a currently running step and maintain the resulting state without advancing to the execution of the next step, and execution restart command means for commanding the execution control means to restart the execution of the interrupted step.

According to the present invention, the execution of the sequence program can be interrupted at any desired step to start the execution of the next step or the execution of selected steps can be skipped without turning off the power source or without previously so setting the sequence program. Thus, inspection and editing can be carried out with ease.

BEST MODE FOR CARRYING OUT THE INVENTION

Figure 1:
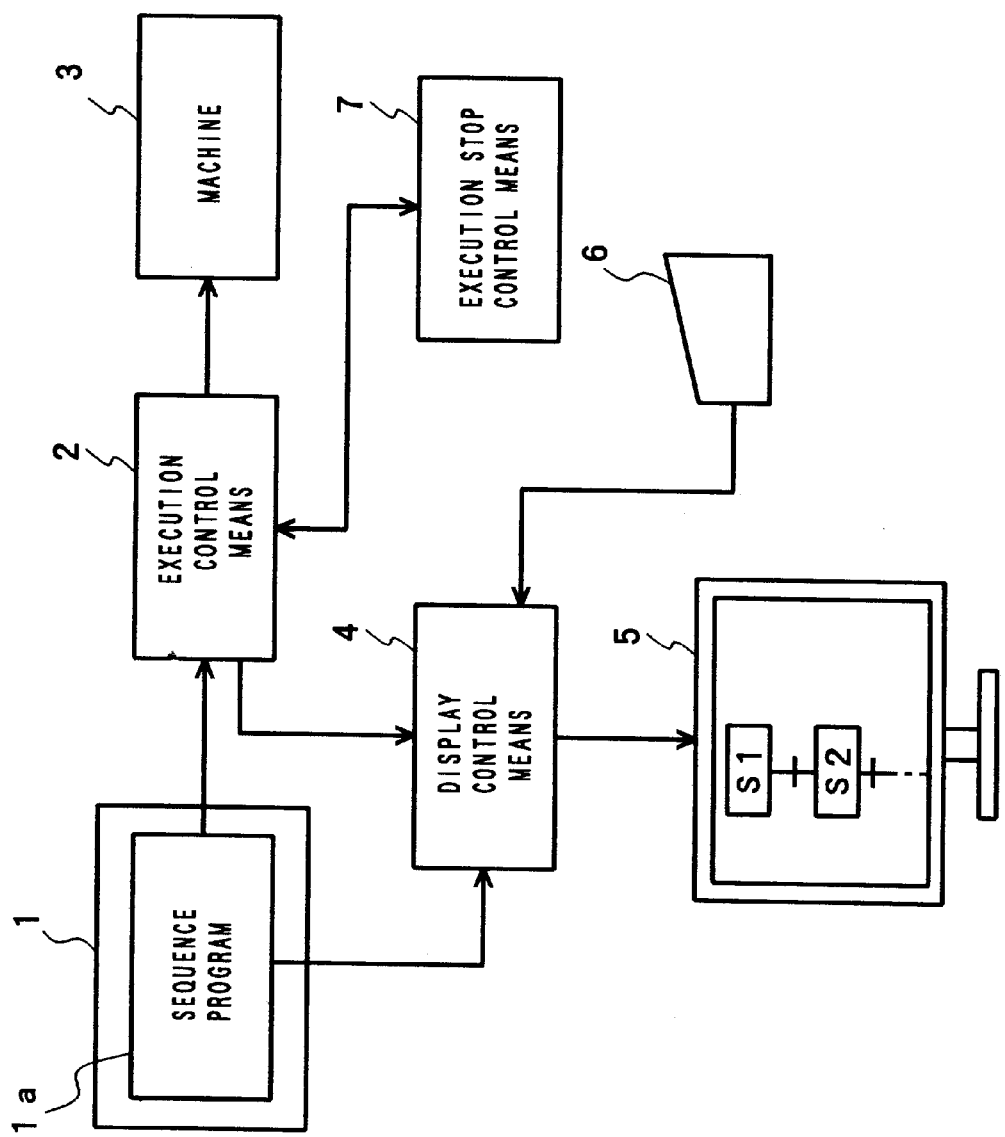
FIG. 1 is a conceptual diagram showing a sequence program execution control system according to the present invention.

Referring first to FIG. 1, an outline of a sequence program execution control system according to the present invention will be described.

A memory 1 stores a sequence program 1a that is expressed in a step format. Execution control means 2 executes this sequence program 1a, thereby carrying out operation control on the side of a machine 3. Display control means 4 enables the sequence program 1a to be displayed on a display screen of a display device 5, currently executed step, among other steps that constitute the sequence program 1a, to be displayed in color or the like for easier recognition by operator, and the contents of various commands inputted through a keyboard 6 to be displayed.

The operator moves a cursor on the screen through the keyboard 6 to specify one of the steps. Further, referring to the cursor position, the operator can command the stoppage of the execution of the sequence program through the keyboard 6. Thereupon, execution stop control means 7 can stop the execution of the sequence program in the step specified by the keyboard 6.

Figure 2:
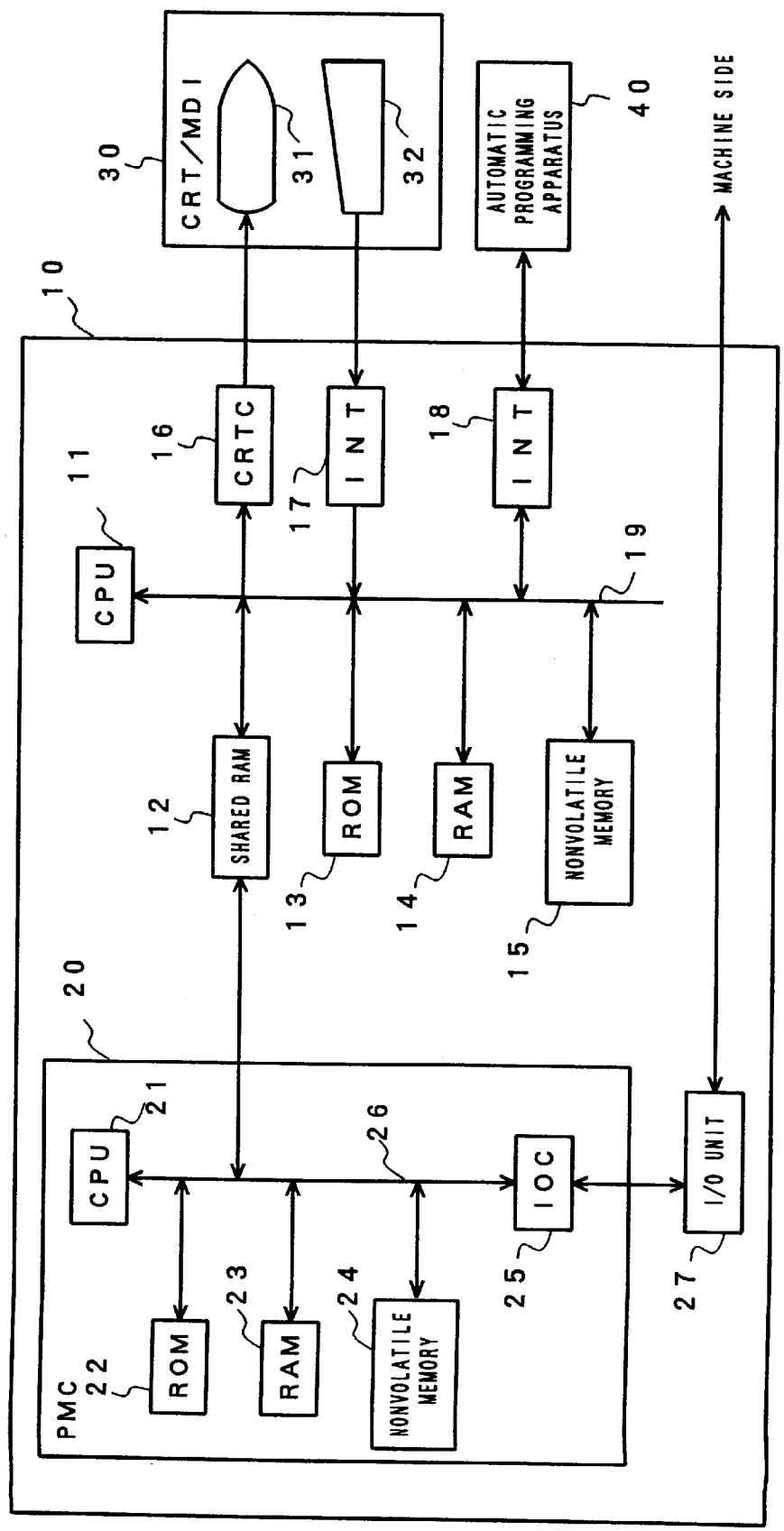
FIG. 2 is a block diagram showing the hardware configuration of a CNC (numerical control device), incorporating the mechanism shown in FIG. 1 with a programmable controller built therein, and connected to an automatic programming apparatus.

Referring now to the block diagram of FIG. 2, hardware that constitutes a CNC (numerical control device) will be described.

A processor 11 of the CNC is connected with a shared RAM 12, ROM 13, RAM 14, nonvolatile memory 15, graphic control circuit 16, and interfaces 17 and 18 through a bus 19.

The ROM 13 stores a system program. This system program is read by the processor 11, and general control of the CNC 10 is executed in accordance with the system program.

The CNC 10 has a PC (programmable controller) 20 therein. Data are transferred between the CNC 10 and the PC 20 through the shared RAM 12. Further, this shared RAM 12 stores necessary data for simultaneous access from both the CNC 10 and the PC 20.

The RAM 14 stores temporarily calculated data, display data, and the like. The nonvolatile memory 15 is formed of a CMOS backed up by a battery or a flash ROM, and stores a tool correction value, pitch error correction value, work program, parameters and the like. Also, the nonvolatile memory 15 stores parameters required on the side of the PC 20.

The graphic control circuit 16 converts digital data, such as the current positions of respective axes, alarms, parameters, image data, etc., into image signals, and outputs them. These image signals are fed to a display device 31 of a CRT/MDI unit 30, and displayed on the display device 31. The display device 31 can also display the parameters, ladder diagrams, etc. on the side of the PC 20. These data are fed from the PC 20 via the shared RAM 12.

The interface 17 receives data from a keyboard 32 in the CRT/MDI unit 30, and delivers them to the processor 11. Data can be also fed to the PC 20 through the keyboard 32. That is, the data inputted by means of the keyboard 6 are fed to the PC 20 via the shared RAM 12.

An automatic programming apparatus 40 is connected to the interface 18. A sequence program created by means of the automatic programming apparatus 40 is read and delivered to the PC 20 through the interface 18. In the automatic programming apparatus 40, as mentioned later, the commands for execution and stop of the sequence program are generated, and these commands are delivered to the PC 20 through the interface 18.

Furthermore, the interface 18 can be connected with external apparatuses (not shown), such as a paper tape reader, paper tape puncher, paper tape reader/puncher, printer, etc. The work program can be read from the paper tape reader. Also, the work program edited in the CNC 10 can be delivered to the paper tape puncher.

Although the bus 19 is further connected with an axis control circuit for controlling servomotors, servo amplifiers, spindle control circuit, spindle amplifier, manual pulse generator interface, etc., none of these elements are shown.

The PC 20 built in the CNC 10 is provided with a processor 21 for PC. The processor 21 is connected to a ROM 22, RAM 23, nonvolatile memory 24, and I/O control circuit 25 through a bus 26. Moreover, the processor is connected to the shared RAM 12 through the bus 26.

The ROM 22 stores a management program for controlling the PC 20. The RAM 23 stores input and output signals, and its contents are rewritten as the sequence program is executed.

The nonvolatile memory 24 is formed of a CMOS backed up by a battery or a flash ROM, and stores the sequence program created and edited in the automatic programming apparatus 40. In general, a sequence program is formed in a ladder language. However, the sequence program used in the present embodiment is written in a step format. This sequence program stored in the nonvolatile memory 24 is transferred to the RAM 23 during operation, and the processor 21 reads and executes the program from the RAM 23.

Also, the sequence program can be displayed on the display device 31. The nonvolatile memory 24 stores those data that have to be retained even after the power source is turned off, as well as the sequence program.

The I/O control circuit 25 converts an output signal stored in the RAM 23 into a serial signal, and delivers it to an I/O unit 27. Also, the circuit 25 converts the serial input signal from the I/O unit 27 into a parallel signal, and delivers it to the bus 26. This signal is loaded into the RAM 23 by the processor 21. The input and output signals stored in the RAM 23 and the data stored in the nonvolatile memory 24 can be displayed on the display device 31 of the CRT/MDI unit 30.

The processor 21 receives command signals, such as an M-function command, T-function command, etc., from the CNC 10 through the shared RAM 12, temporarily loads them into the ROM 22, processes the commands in accordance with sequence program stored in the ROM 22, and delivers them to the I/O unit 27 via the I/O control circuit 25. A hydraulic apparatus, pneumatic apparatus, electromagnetic apparatus, etc. on the machine side are controlled in accordance with these output signals.

Further, the processor 21 receives input signals, such as machine-side limit switch signals from the I/O unit 27, operation switch signals from a machine control panel, etc., and temporarily loads them into the RAM 23. Those input signals which need not be processed by means of the PC 20 are fed to the processor 11 via the shared RAM 12. The other signals are processed according to the sequence program. Some of the processed signals are delivered to the CNC side, while others are delivered as output signals from the I/O unit 27 to the machine side via the I/O control circuit 25.

Furthermore, the sequence program can be made to include commands for controlling the movement of the axes and the like. When these commands are read from the nonvolatile memory 24 by the processor 21, they are fed to the processor 11 via the shared RAM 12 and used to control the servomotors. Likewise, a spindle motor and the like can be controlled in response to a command from the side of the PC 20.

Figure 3:
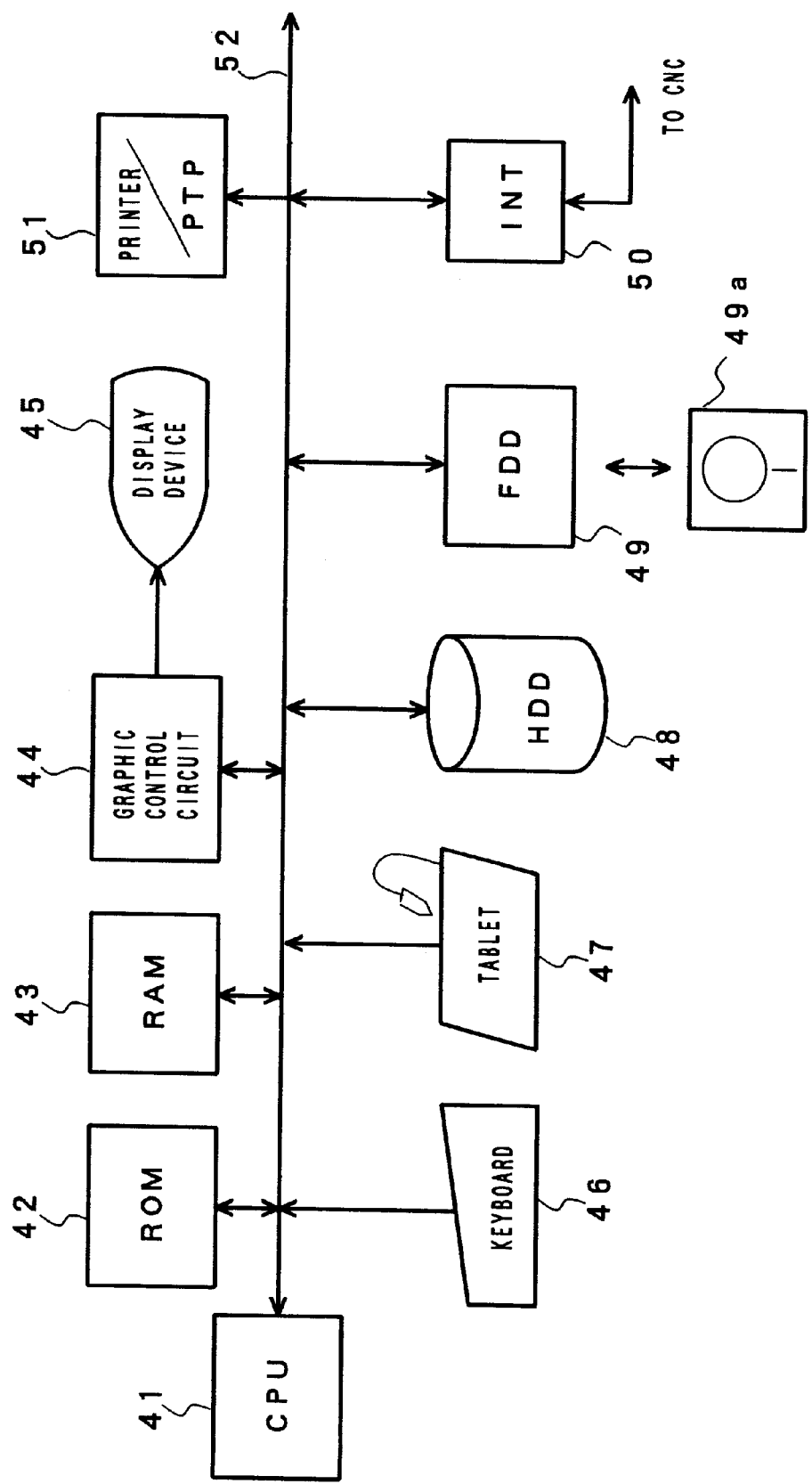
FIG. 3 is a block diagram showing the hardware configuration of the automatic programming apparatus of FIG. 2.

Referring now to the block diagram of FIG. 3, hardware that constitutes the automatic programming apparatus 40 will be described.

A processor 41 of the automatic programming apparatus 40 is connected with a ROM 42, RAM 43, graphic control circuit 44, keyboard 46, tablet 47, hard disk drive 48, floppy disk drive 49, interface 50, and printer/paper tape puncher 51.

The ROM 42 stores a system program. The automatic programming apparatus 40 is controlled in accordance with this system program. The RAM 43 stores a sequence program to be executed in the PC 20, data on the current state of execution on the PC 20, etc.

The graphic control circuit 44 converts display data from the processor 41 into display signals, and delivers them to a display device 45. The display device 45 displays the data on the screen in response to these display signals. A CRT or liquid crystal display device is used as the display device 45. The keyboard 46 is provided with operation keys, function keys, etc. that are used to input data. The data may also be inputted by means of a tablet 47, mouse (not shown), etc.

The hard disk drive 48 stores data, such as the created sequence program, that are expected to be retained after the power source is turned off. The floppy disk drive 49 can drive a floppy disk 49a to read the sequence program and the like and load the created or edited sequence program into the floppy disk 49a. The created sequence program can also be output to the printer/paper tape puncher 51.

The sequence program stored in the nonvolatile memory 24 of the PC 20, the data on the current state of execution of the sequence program, etc. are read through the interface 50, and are loaded into the RAM 43. Also, sequence data edited by the automatic programming apparatus 40, an execution command and a stop command (mentioned later), etc. are delivered through the interface 50 to the PC 20.

Figure 4:
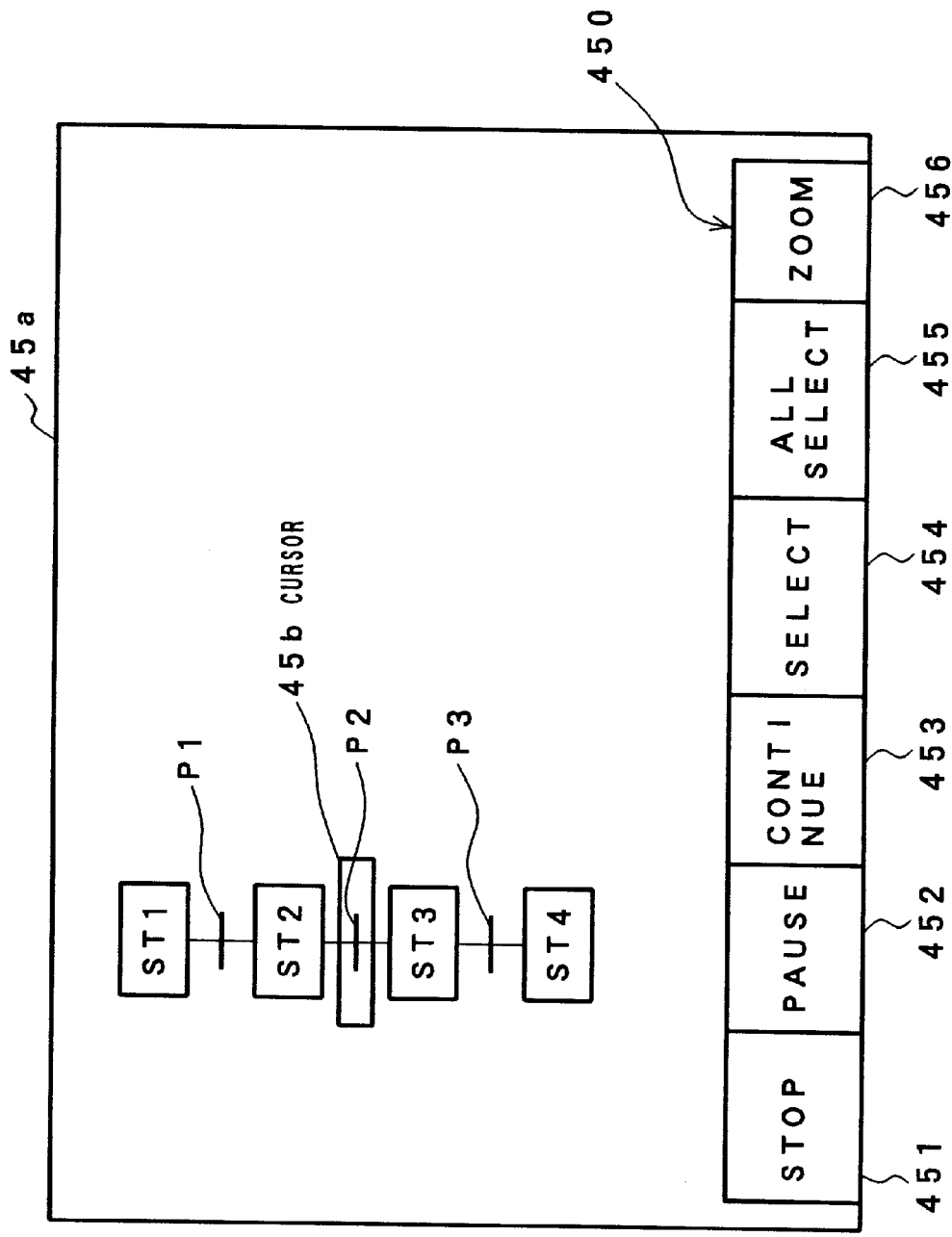
FIG. 4 shows an example of a display of a sequence program, on the side of automatic programming apparatus side, to be executed by means of the programmable controller of FIG. 2.

FIG. 4 shows an example of a display mode in which the sequence program executed by the PC 20 is displayed on the display device 45 of the automatic programming apparatus 40.

The sequence program expressed in a step format is displayed on a display screen 45a of the display device 45. The displayed example is of the sequence program composed of four steps ST1 to ST4 and three transitions P1 to P3. Displayed on the display screen 45a, is a cursor 45b that can be moved by means of the keyboard 46. Furthermore, on the display screen 45a, the currently executed step (one of the steps ST1 to ST4) is displayed in a color different from the colors of other portions or as flickering display.

Further, a software key display section 450 is displayed on the lower part of the display screen 45a. The software key display section 450 is provided with, for example, six menus 451 to 456 that correspond individually to the function keys (not shown) of the keyboard 46.

The sequence program to be displayed on this display screen 45a is displayed on the side of the PC 20. When something is wrong, for example, with the step ST2, and the execution process will not advance to the step ST3 during the execution ("ST2" displayed on the screen 45a is discriminated by the different color or flickering), the operator puts the cursor 45b on the step ST2, commands for "SELECT" of the menu 454, and further commands for "STOP" of the menu 451. This command for "STOP" is fed immediately to the PC 20 through the interface 50. On receiving this, on the other hand, the PC 20 skips the transition P2 or discontinue the processing of the step ST2, and starts to execute the next step (ST3) and the subsequent steps.

The "SELECT" of the menu 454 allows selection of a plurality of transitions. The selected steps need not be consecutive steps. If the "STOP" of the menu 451 is commanded after a plurality of steps are selected, all the selected steps will be skipped.

On the other hand, when the cause of the fault in step ST2 has to be checked, command is given for "PAUSE" of the menu 452. Thereupon, the execution of the sequence program stays in the step ST2 and will not advance to the step ST3 and the subsequent steps. If "ZOOM" of the menu 456 is commanded at this point of time, a ladder program that constitutes the step ST2 is displayed on the display screen 45a. Thus, the cause of the fault can be recognized, or the program can be reedited.

When the execution of the sequence program has to be resumed after the causes of the fault are recognized or reediting of the program, the execution can be resumed in the step ST2 by commanding "CONTINUE" of the menu 453.

When "ALL SELECT" of the menu 455 is commanded during the execution of the step ST2, all the transitions P2 and P3 after the step ST2 in execution are selected. When the "STOP" of the menu 451 is then commanded, the execution of the step ST2 is discontinued, and thereafter, the steps ST3 and ST4 are skipped without being executed, whereupon the execution of this sequence program is finished. Thus, the execution is restarted in the state before the start of the processing of the step ST2, so that the number of processes required before the restart of operation after removing the cause of the trouble can be reduced.

Figure 5:
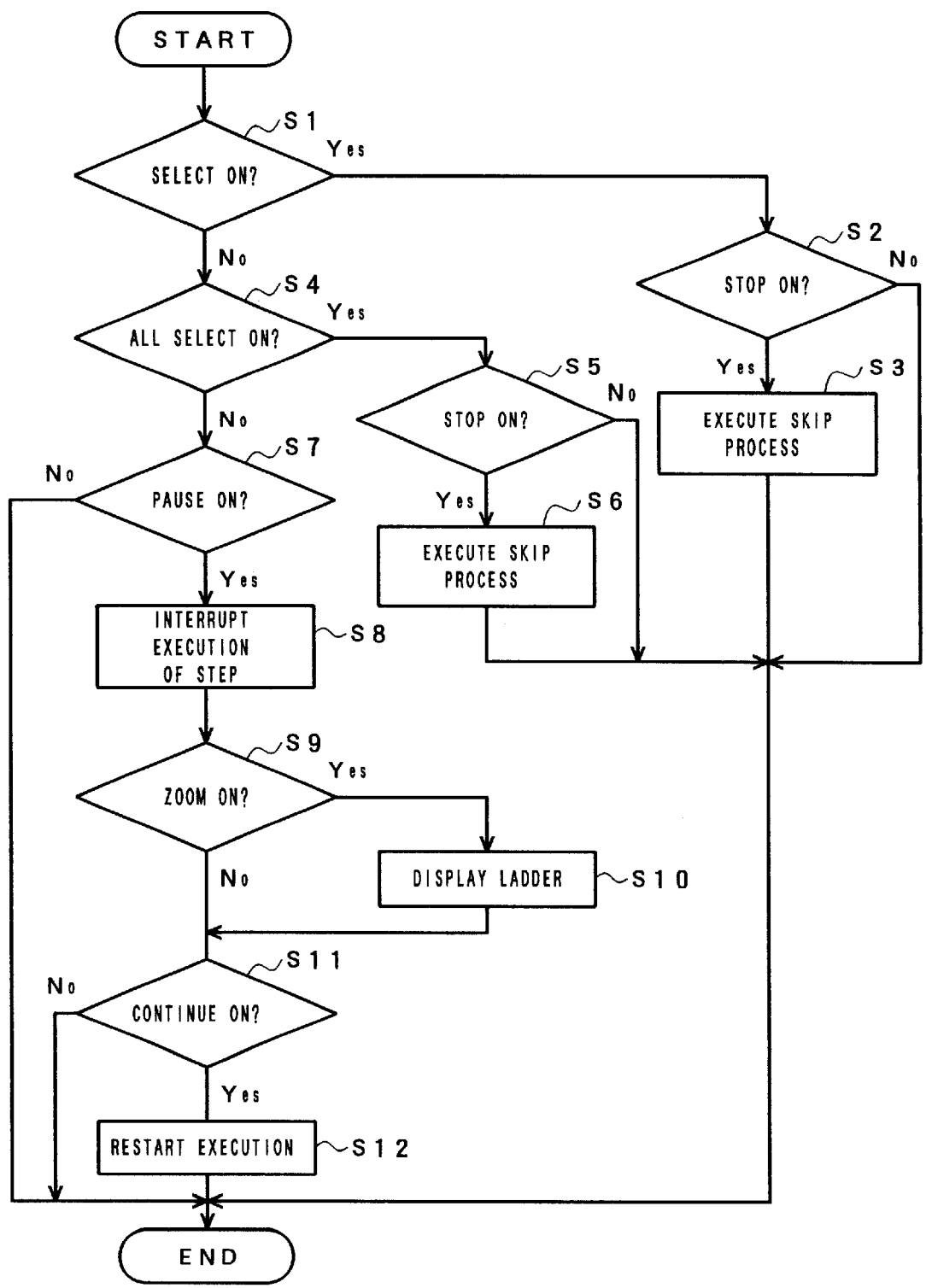
FIG. 5 is a flowchart showing procedures of a sequence program control processing to be executed by a processor of the programmable controller of FIG. 2.

Referring now to the flowchart of FIG. 5, specific procedures for a sequence program execution control process to be executed by the processor 21 of the PC 20 will be described. This control process is started simultaneously with the execution of the sequence program displayed on the screen, and is repeated in predetermined cycles thereafter.

First, it is determined whether or not the "SELECT" is commanded (Step S1). When the "SELECT" is commanded, it is then determined whether or not the "STOP" is commanded (Step S2). On the other hand, when the "STOP" is not commanded after the "SELECT" is commanded, processing for the cycle concerned is finished. On the other hand, when the "STOP" is commanded after the "SELECT" is commanded, one or two or more transitions specified by the cursor 45b and the "SELECT" are all skipped, and the execution of those steps which have not been specified by the "SELECT" is started.

On the other hand, when the "SELECT" is not commanded, it is then determined whether or not the "ALL SELECT" is commanded (Step S4). When the "ALL SELECT" is commanded, it is determined whether or not the "STOP" is further commanded (Step S5). When the "STOP" is not further commanded after the "ALL SELECT" has been commanded, the processing for the cycle concerned is finished. In contrast, when the "STOP" is commanded after the "ALL SELECT" has been commanded, processing of step in progress is discontinued, and the subsequent steps are skipped without being executed (Step S6), whereupon the processing for the cycle concerned is finished.

If neither the "SELECT" nor the "ALL SELECT" is commanded, it is then determined whether or not the "PAUSE" is commanded (Step S7). If the "PAUSE" has not been commanded either, the processing for the cycle concerned is finished. If the "PAUSE" has been commanded, on the other hand, processing of the step currently in execution is discontinued, and the interrupted state is maintained so that the subsequent steps will not be started.

When the processing of the step in execution is kept interrupted in response to the command for "PAUSE", it is determined whether or not the "ZOOM" is commanded (Step S9). If the "ZOOM" has been commanded, a ladder program of the interrupted step is displayed on the display screen, and it is then determined whether or not the "CONTINUE" is commanded (Step S11). If the "ZOOM" has not been commanded, on the other hand, it is immediately determined whether or not the "CONTINUE" is commanded. When the "ZOOM" is commanded, and the ladder program of the interrupted step is displayed on the display screen, the ladder program is corrected by using the keyboard 46 of the automatic programming apparatus 40, whereby the sequence program can be rewritten.

When the "CONTINUE" has not been commanded yet, the processing for the cycle concerned is finished without restarting the execution of the step that is interrupted in response to the command for "PAUSE". If the "CONTINUE" is commanded, on the other hand, the execution is restarted from the interrupted step.

Thus, according to the present embodiment, the step in execution can be stopped in response to the command given on the display screen, so that the execution can be interrupted without turning off the power source to the PC 20 and without previously modifying the program. In consequence, inspection and editing can be carried out with ease.

According to the present embodiment, interruption of execution and the like are effected by means of the automatic programming apparatus 40, but it may be carried out by using the CRT/MDI unit 30 of the CNC 10.

Furthermore, according to the present embodiment, a sequential function chart (SFC) is given as an example of the step-format sequence program. However, the present invention may be also applied to a sequence program in any other format, such as a flowchart format or process inching format.

What is claimed is:

1. A sequence program execution control system comprising:

program storage means for storing a sequence program composed of a plurality of steps;

execution control means for executing said sequence program step by step in order, thereby carrying out operation control on the side of a machine;

step specifying means for specifying any one or two or more of the steps constituting the sequence program stored in said program storage means; and skip command means for commanding said execution control means compulsorily to advance from the step specified by said step specifying means to the next step.

2. A sequence program execution control system according to claim 1, wherein said step specifying means and said skip command means are attached individually in the form of command keys to a manual input device with display screen connected to a numerical control device.

3. A sequence program execution control system according to claim 2, wherein said manual input device with display screen further includes interruption command means for commanding said execution control means to interrupt the execution of a currently executed step and maintain the resulting state without advancing to the execution of the next step, execution restart command means for commanding said execution control means to restart the execution of the interrupted step, and initial state setting means for enabling all the steps after the step in execution to be skipped to return to the beginning of the program, in the form of command keys, respectively.

4. A sequence program execution control system according to claim 1, further comprising interruption command means for commanding said execution control means to interrupt the execution of a step currently in execution and maintain the resulting state without advancing to the execution of the next step.

5. A sequence program execution control system according to claim 4, further comprising an execution restart commanding means for commanding said execution control means to restart the execution of the interrupted step.

6. A sequence program execution control system according to claim 4, further comprising a function for displaying a program of the interrupted step on a screen.

7. A sequence program execution control system according to claim 1, wherein said step specifying means and said skip command means are attached to a manual input device with display screen of an automatic programming apparatus connected to a numerical control device.

8. A sequence program execution control system according to claim 1, further comprising initial state setting means for enabling all the steps after a currently executed step to be skipped to return to the beginning of the program.

9. A sequence program execution control method, wherein:

a programmable controller is actuated by a sequence program written in the form of an SFC (sequential function chart), simultaneously causing the sequence program to be displayed on a display screen of a manual input device;

a currently executed step is discriminated from a plurality of other steps constituting the sequence program displayed on said display screen;

one or more of a plurality of transitions of the sequence program displayed on the screen are specified by means of a first key assigned to the manual input device; and the specified transition or transitions are skipped, and the sequence is shifted to the next step not specified by the first key or returned to the beginning of the program, by means of a second key assigned to the manual input device.

* * * * *